United States Patent
Kalnes

(10) Patent No.: US 8,853,475 B2
(45) Date of Patent: Oct. 7, 2014

(54) PROCESS FOR PRODUCING A RENEWABLE HYDROCARBON FUEL

(75) Inventor: Tom N. Kalnes, LaGrange, IL (US)

(73) Assignee: UOP LLC, Des Plaines, IL (US)

( * ) Notice: Subject to any disclaimer, the term of this patent is extended or adjusted under 35 U.S.C. 154(b) by 966 days.

(21) Appl. No.: 12/969,335

(22) Filed: Dec. 15, 2010

(65) Prior Publication Data

US 2012/0157729 A1 Jun. 21, 2012

(51) Int. Cl.
*C07C 1/00* (2006.01)
*C10G 3/00* (2006.01)
*C10G 1/00* (2006.01)
*C10G 1/02* (2006.01)

(52) U.S. Cl.
CPC *C10G 1/002* (2013.01); *C10G 3/50* (2013.01); *C10G 3/47* (2013.01); *C10G 2300/207* (2013.01); *C10G 3/42* (2013.01); *C10G 3/46* (2013.01); *C10G 2300/4043* (2013.01); *Y02E 50/14* (2013.01); *C10G 2400/26* (2013.01); *C10G 3/49* (2013.01); *C10G 2300/1014* (2013.01); *C10G 1/02* (2013.01); *C10G 3/44* (2013.01)
USPC ............... 585/240; 585/242; 44/605; 44/606; 201/21; 201/28; 201/29

(58) Field of Classification Search
CPC .......... C10G 3/40; C10G 45/00; C10G 49/00; C10G 2300/1011; C10G 2300/1048; C10G 2300/42; Y02E 50/10; Y02E 50/14
USPC ......... 585/240, 242; 44/605, 606; 201/21, 28, 201/29
See application file for complete search history.

(56) References Cited

U.S. PATENT DOCUMENTS

| | | | |
|---|---|---|---|
| 5,792,340 A | 8/1998 | Freel et al. | |
| 6,767,530 B2 | 7/2004 | Kobayashi et al. | |
| 6,964,758 B2 | 11/2005 | Cortright et al. | |
| 7,399,341 B2 | 7/2008 | Patel et al. | |
| 8,217,210 B2 * | 7/2012 | Agrawal et al. | 585/240 |
| 2007/0049648 A1 | 3/2007 | Shessel | |

(Continued)

FOREIGN PATENT DOCUMENTS

| | | | |
|---|---|---|---|
| EP | 165839 | * | 5/1985 |
| WO | 2009059936 A2 | | 5/2009 |

(Continued)

OTHER PUBLICATIONS

Davda et al., "A Review of Catalytic Issues and Process Conditions for Renewable Hydrogen and Alkanes by Aqueous-Phase Reforming of Oxygenated Hydrocarbons Over Supported Metal Catalysts", Applied Catalysis B: Environmental, 2005, vol. 56, pp. 171-186.

(Continued)

*Primary Examiner* — Nina Bhat
(74) *Attorney, Agent, or Firm* — Maryann Maas

(57) ABSTRACT

A process for producing a renewable hydrocarbon fuel. The process can include providing a feed including a lignocellulosic material to a pyrolysis zone to produce a stream including a pyrolysis oil, providing the pyrolysis oil stream to a refining zone producing a refined stream, providing at least a portion of the refined stream to a reforming zone producing a stream including hydrogen, providing at least a portion of the hydrogen stream to the refining zone; and recovering the renewable hydrocarbon fuel from the refined stream.

20 Claims, 1 Drawing Sheet

(56) References Cited

U.S. PATENT DOCUMENTS

| | | | |
|---|---|---|---|
| 2009/0005614 | A1 | 1/2009 | Hulteberg et al. |
| 2009/0069610 | A1 | 3/2009 | Roberts, IV et al. |
| 2009/0082604 | A1* | 3/2009 | Agrawal et al. ............... 585/242 |
| 2009/0127512 | A1 | 5/2009 | Basini et al. |
| 2009/0158637 | A1 | 6/2009 | McCall et al. |
| 2009/0162264 | A1 | 6/2009 | McCall et al. |
| 2009/0229174 | A1 | 9/2009 | Brady et al. |
| 2009/0239279 | A1 | 9/2009 | Hall et al. |
| 2009/0259082 | A1* | 10/2009 | Deluga et al. ................... 585/14 |
| 2009/0287029 | A1 | 11/2009 | Anumakonda et al. |
| 2009/0294324 | A1 | 12/2009 | Brandvold et al. |
| 2009/0301930 | A1 | 12/2009 | Brandvold et al. |
| 2010/0058648 | A1 | 3/2010 | Marker et al. |
| 2010/0076238 | A1 | 3/2010 | Brandvold et al. |
| 2010/0140136 | A1* | 6/2010 | Spilker et al. ................... 208/57 |
| 2010/0196242 | A1 | 8/2010 | Stanic et al. |
| 2010/0228062 | A1 | 9/2010 | Babicki et al. |
| 2010/0256428 | A1* | 10/2010 | Marker et al. ................. 585/240 |
| 2012/0067773 | A1* | 3/2012 | Ditsch ............................. 208/51 |

FOREIGN PATENT DOCUMENTS

| | | | |
|---|---|---|---|
| WO | 2009129622 | A1 | 10/2009 |
| WO | 2009152873 | A1 | 12/2009 |
| WO | 2010033789 | A2 | 3/2010 |

OTHER PUBLICATIONS

Shabaker et al., "Aqueous-Phase Reforming of Oxygenated Hydrocarbons Over Sn-Modified Ni Catalysts", Journal of Catalysis, 2004, vol. 222, pp. 180-191.

Simonetti et al., "Gas-Phase Conversion of Glycerol to Synthesis Gas Over Carbon-Supported Platinum and Platinum—Rhenium Catalysts", Journal of Catalysis, 2007, vol. 247, pp. 298-306.

Adhikari et al., "Hydrogen Production from Glycerin by Steam Reforming over Nickel Catalysts", Renewable Energy, 2008, vol. 33, pp. 1097-1100.

Aresta et al., "Energy from Aquatic Biomass: An Integrated Approach to Biodiesel and Hydrogen Production", DGMK Tagungsbericht, 2008, No. 3, pp. 101-108.

Buffoni et al., "Nickel Catalysts Applied in Steam Reforming of Glycerol for Hydrogen Production", Catalysis Communications, 2009, Volume Refer: CATCOM 2098, p. 18 pages.

Burch, "Manufacturing Sustainable Hydrogen for Refinery Processes by Catalytic Conversion of Pyrolysis Oil from Biomass", King Fahd Univ. Petroleum and Minerals Research Inst.—Annual Catalysts in Petroleum Refining & Petrochem. Symposium Papers, Nov. 2009, p. 62.

Byrd et al., "Hydrogen Production from Glycerol by Reforming in Supercritical Water over Ru/Al2O3 Catalyst", Fuel, 2008, vol. 87, pp. 2956-2960.

Chen et al., "Novel Nickel-Based Catalyst for Low Temperature Hydrogen Production from Methane Steam Reforming in Membrane Reformer", Asia-Pacific Journal of Chemical Engineering, Jan.-Feb. 2010, vol. 5, No. 1, pp. 93-100.

Courson et al., "Development of Ni Catalysts for Gas Production from Biomass Gasification. Reactivity in Steam- and Dry-Reforming", Catalysis Today, Dec. 2000, vol. 63, No. 2/4, pp. 427-437.

Cui et al., "Steam Reforming of Glycerol: The Experimental Act. of La1-xCexNiO3 Catalyst in Comparison to Thermodynamic Reactn Equil.", Applied Catalysis B: Environmental, 2009, p. 9 pages.

Diesel Fuel News, "Intelligence on Technology, Compliance and Refining Process . . . Worldwide", May 11, 2009, vol. 13, No. 10, Publisher: Hart, p. 30.

Dou et al., "Hydrogen Production by Sorption-Enhanced Steam Reforming of Glycerol", Bioresource Technology, Mar. 2009, vol. 100, pp. 3540-3547.

Evans et al., "Renewable Hydrogen Production by Catalytic Steam Reforming of Peanut Shells Pyrolysis Products", American Chemical Society, Division Fuel Chemistry, Preprints, Fall 2003, vol. 48, No. 2, pp. 594-595.

Hulteberg et al., "A Study of Combined Biomass Gasification and Electrolysis for Hydrogen Production", International Journal of Hydrogen Energy, Jan. 2009, vol. 34, No. 2, pp. 772-782.

Kalnes et al., "Envergent Biofuel Technology and Life Cycle Assessment", Envergent Technologies Power Point Presentation for 2009 International Conference TC Biomass Conversion Science, Sep. 2009, p. 24 Pages.

Kunkes et al., "An Integrated Catalytic Approach for Production of Hydrogen by Glycerol Reforming Coupled with Water-Gas-Shift", Applied Catalysis B: Environmental, 2009, Volume Refer. APCATB 10703, p. 29 pages.

Levin et al., "Challenges for Renewable Hydrogen Production from Biomass", International Journal of Hydrogen Energy, May 2010, vol. 35, No. 10, pp. 4962-4969.

Marker et al., "Integrated Hydropyrolysis and Hydroconversion Process for Production of Gasoline and Diesel Fuel from Biomass", Conference Proceedings—2009 AIChE Annual Meeting, 09AIChE, Nov. 2009, p. 11 Pages.

Slinn et al., "Steam Reforming of Biodiesel By-Product to Make Reweable Hydrogen", Bioresource Technology, Sep. 2008, vol. 99, No. 13, pp. 5851-5858.

Swami et al., "Integrated Catalytic Process for Conversion of Biomass to Hydrogen", Energy & Fuels, 2006, vol. 20, No. 6, pp. 2616-2622.

Swami et al., "Production of Hydrogen from Glucose as a Biomass Simulant: Integrated Biological and Thermochemical Approach", Industrial Engineering Chemical Research, 2008, vol. 47, No. 10, Abstract Page and pp. 3645-3651.

"TCBiomass2009 The International Conference on Thermochemical Conversion Science", Conference Brochure for TCBiomass Sep. 16-18, 2009, 2009, p. 8 Pages.

* cited by examiner

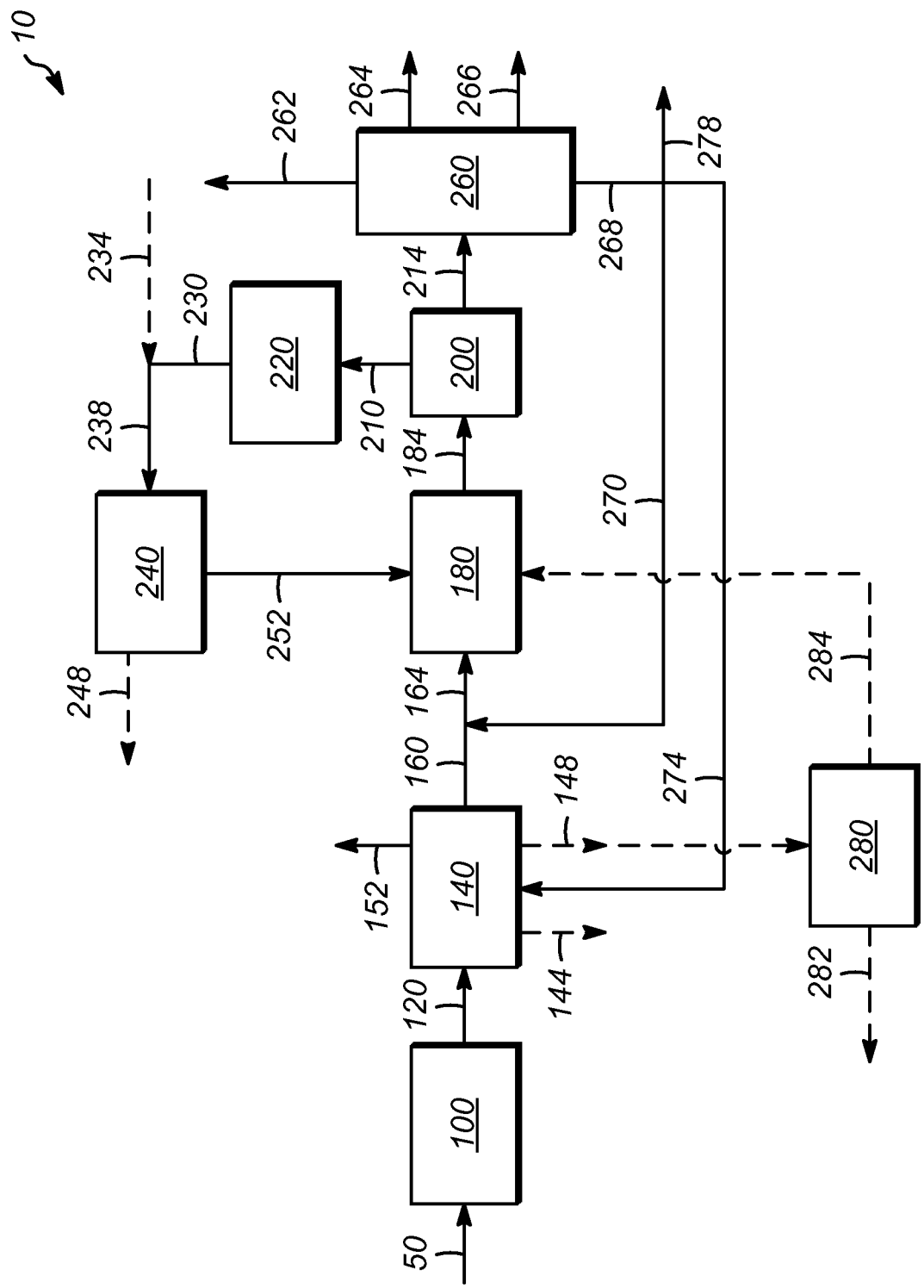

PROCESS FOR PRODUCING A RENEWABLE HYDROCARBON FUEL

FIELD OF THE INVENTION

This invention generally relates to a process for producing a renewable hydrocarbon fuel.

DESCRIPTION OF THE RELATED ART

Generally, concerns over fossil fuel greenhouse gas emissions have led to an increasing emphasis on renewable energy sources. Wood and other forms of biomass including agricultural and forestry residues are examples of some types of biomass feedstocks being considered for the production of liquid fuels.

Pyrolysis may be used for obtaining liquid fuels from these biomass feedstocks. Generally, pyrolysis refers to thermal decomposition in the substantial absence of oxygen or in the presence of significantly less oxygen than required for complete combustion. In addition to the desired liquid product, other streams, such as char ash, and non-condensable gases may be obtained as less desirable byproducts. However, significantly improved yields of primary, non-equilibrium liquids and gases, such as valuable chemicals, chemical intermediates, petrochemicals, and fuels, may be obtained from carbonaceous feedstocks through fast pyrolysis.

When producing transportation fuels by combination of pyrolysis and hydrogen refining, a very significant quantity of hydrogen can be required to produce a fully deoxygenated biofuel meeting ASTM standards for use as either blend stocks or drop-in replacements for petroleum gasoline, kerosene, and diesel fuel. If this hydrogen is supplied by reforming a fossil fuel, the greenhouse gas (may be abbreviated hereinafter "GHG") footprint for the biofuel can suffer because the fossil fuel can have a relatively high carbon footprint. As a consequence, it would be difficult to produce a biofuel meeting regulatory requirements with a reduced GHG emission.

SUMMARY OF THE INVENTION

One exemplary embodiment can be a process for producing a renewable hydrocarbon fuel. The process can include providing a feed including a lignocellulosic material to a pyrolysis zone to produce a stream including a pyrolysis oil, providing the pyrolysis oil stream to a refining zone producing a refined stream, providing at least a portion of the refined stream to a reforming zone producing a stream including hydrogen, providing at least a portion of the hydrogen stream to the refining zone, and recovering the renewable hydrocarbon fuel from the refined stream.

Another exemplary embodiment may be a process for producing a renewable hydrocarbon fuel while minimizing fossil fuel derived carbon dioxide emissions. The process can include providing a lignocellulosic material to a pretreating zone to obtain a pretreated feed, providing the pretreated feed to a pyrolysis zone to produce a stream including a pyrolysis oil, providing the pyrolysis oil stream to a refining zone producing a refined stream, providing the refined stream to a separation zone to obtain a stream including a fuel gas and a stream including one or more hydrocarbons, providing the fuel gas stream to a conditioning zone to obtain a conditioned stream, providing the conditioned stream to a reforming zone to obtain a stream including hydrogen, and providing the hydrogen stream to the refining zone.

A further exemplary embodiment can be a process for producing a renewable hydrocarbon fuel while minimizing fossil-derived carbon dioxide emissions. Generally, the process includes grinding a lignocellulosic material in a pretreating zone to obtain a pretreated feed, heating the pretreated feed in a pyrolysis zone to produce a stream including a pyrolysis oil, hydrotreating the pyrolysis oil in a refining zone to produce a refined stream, separating the refined stream to obtain a stream including a fuel gas and a stream including one or more hydrocarbons, scrubbing the fuel gas stream, reforming the fuel gas stream to obtain a stream including hydrogen, and providing the hydrogen stream to the refining zone.

The embodiments disclosed herein can use a renewable feed, particularly a lignocellulosic material that can be utilized in a pyrolysis process that generates multiple liquid streams. At least one of the liquid streams, such as an aqueous stream rich in water, can be provided to an aqueous phase reforming zone to reform the stream as well as generate hydrogen that can be recycled to a refining zone. In addition, another stream can be provided to a steam reforming zone for reforming as well as generating hydrogen that can be recycled to the refining zone. As a result, the life cycle GHG emissions from refining can be minimized allowing the production of a biofuel that can meet either local and/or federal regulatory requirements.

DEFINITIONS

As used herein, the term "stream" can include various hydrocarbon molecules, such as straight-chain, branched, or cyclic alkanes, alkenes, alkadienes, and alkynes, and other substances, such as gases, e.g., hydrogen, carbon oxides, or inorganic impurities, such as alkali metals, and sulfur and nitrogen compounds. The stream can also include aromatic and non-aromatic hydrocarbons. Moreover, the hydrocarbon molecules may be abbreviated C1, C2, C3 . . . Cn where "n" represents the number of carbon atoms in the one or more hydrocarbon molecules. Furthermore, a superscript "+" or "−" may be used with an abbreviated one or more hydrocarbons notation, e.g., $C3^+$ or $C3^-$, which is inclusive of the abbreviated one or more hydrocarbons. As an example, the abbreviation "$C3^+$" means one or more hydrocarbon molecules of three carbon atoms and/or more.

As used herein, the term "zone" can refer to an area including one or more equipment items and/or one or more sub-zones. Equipment items can include one or more reactors or reactor vessels, heaters, exchangers, pipes, pumps, compressors, and controllers. Additionally, an equipment item, such as a reactor, dryer, or vessel, can further include one or more zones or sub-zones.

As used herein, the term "rich" can mean an amount of at least generally about 50%, and preferably about 70%, by mole, of a compound or class of compounds in a stream.

As used herein, the term "substantially" can mean an amount of at least generally about 80%, preferably about 90%, and optimally about 99%, by mole, of a compound or class of compounds in a stream.

As depicted, process flow lines in the figures can be referred to interchangeably as, e.g., lines, pipes, feeds, products, effluents, portions, parts, or streams.

As used herein, the term "pyrolysis oil," may refer to an oil obtained directly from pyrolysis or having undergone treatment such as filtration to remove solids and/or ion exchange to remove soluble metals, prior to hydroprocessing.

As used herein, the term "vapor" can mean a gas or a dispersion that may include or consist of one or more hydrocarbons and/or water.

As used herein, the term "overhead stream" can mean a stream withdrawn at or near a top of a column, typically a flash drum or distillation column.

As used herein, the term "bottom stream" can mean a stream withdrawn at or near a bottom of a column, typically a flash drum or distillation column.

As used herein, the terms "alkane" and "paraffin" may be used interchangeably.

As used herein, the terms "alkene" and "olefin" may be used interchangeably, and may include one or more olefins and diolefins.

As used herein, the term "renewable hydrocarbon fuel" may be any fuel at least partially derived from sources other than a fossil fuel. A renewable hydrocarbon fuel can include renewable naphtha and renewable diesel, and having a distillation range as defined by, e.g., ASTM Test Method D86 or D2887.

As used herein, the term "fossil fuel" can mean any fuel derived from animal or vegetable sources in past geologic ages buried in the earth. Exemplary fossil fuels may include petroleum, natural gas, coal, and lignite.

As used herein, a lifecycle greenhouse gas emission value can be based on carbon dioxide equivalents, as measured according to guidelines set forth by the Intergovernmental Panel on Climate Change (IPCC) and the U.S. Federal Government. Lifecycle assessment values of emissions in terms of carbon dioxide equivalents, from raw material cultivation (in the case of plant materials) or raw material extraction (in the case of fossil fuels) through fuel combustion, can be calculated using SimaPro 7.1 software and IPCC GWP 100a methodologies and provide in units of grams of carbon dioxide equivalent per mega joule (herein may be abbreviated "g $CO_2$ equivalent/MJ").

BRIEF DESCRIPTION OF THE DRAWING

FIG. 1 is a schematic depiction of an exemplary biofuel production facility.

DETAILED DESCRIPTION

Referring to FIG. 1, a biofuel production facility 10 can include a pretreating zone 100, a pyrolysis zone 140, a refining zone 180, a separation zone 200, a conditioning zone 220, a reforming zone 240, a fractionation zone 260, and another reforming zone 280.

Generally, the biofuel production facility 10 can receive a feed 50 including one or more carbonaceous feedstocks that are classified as renewable. Typically, the feed 50 can be any biomass material or mixture of biomass materials having lignocellulosic material, including a hardwood, a softwood, a hardwood or softwood bark, or logging residues. The feed 50 may also include energy crops, agricultural residues, or other types of plant wastes or plant-derived wastes. Specific exemplary plant materials may include corn fiber, corn stover, and sugar cane bagasse, in addition to "on-purpose" energy crops such as switchgrass, miscanthus, and algae. Generally, short rotation forestry products, as energy crops, include alder, ash, southern beech, birch, eucalyptus, poplar, willow, paper mulberry, Australian blackwood, sycamore, and varieties of paulownia elongate. Other examples of suitable biomass can include organic waste materials, such as waste paper and construction, demolition, and municipal wastes. In general, the feed 50 may include any biomass including lignocellulosic material. Because the lignocellulosic biomass may be composed of the same building blocks, namely cellulose, hemicellulose, and lignin, pyrolysis conditions can be relatively similar for processing varying feeds.

The feed 50 can be provided to a pretreating zone 100. The pretreating zone 100 can utilize any suitable process for reducing the feed 50 to a suitable material for being processed by the pyrolysis zone 140. The pretreating process can include at least one of sizing, magnetic separation, drying, and grinding. Such pretreating processes are disclosed in, e.g., US 2010/0140136 A1.

Afterwards, a pretreated feed 120 can be provided to the pyrolysis zone 140. The pyrolysis zone 140 can operate under any suitable conditions, such as a temperature of about 300-about 600° C. and a residence time of about 0.1-about 5 seconds. Exemplary pyrolysis zones and operating conditions are disclosed in, e.g., U.S. Pat. No. 5,792,340 and US 2009/0239279 A1. The pyrolysis zone 140 can include any suitable pyrolysis reactor, such as a fluidized-bed reactor, a transport reactor, a cyclonic ablative reactor, or a vacuum pyrolysis reactor.

The pyrolysis zone 140 can provide a solid byproduct stream 144, an aqueous byproduct stream 148 rich in water, a gas byproduct stream 152, and a pyrolysis oil stream 160. The aqueous byproduct stream 148 can optionally be provided to another reforming zone 280, which can be an aqueous phase reforming zone, such as disclosed in, e.g., U.S. Pat. No. 6,964,758 B2. Typically, the reaction is conducted in a condensed liquid phase over a metal catalyst impregnated on a water-compatible support. The reaction can be conducted at any suitable temperature and pressure.

The reforming zone 280 can process the aqueous byproduct stream 148 to produce one or more hydrocarbons as a stream 282 as well as a hydrogen stream 284. Optionally, the hydrogen stream 284 can be recycled to the refining zone 180, as hereinafter described. Usually, the hydrogen generated from the aqueous byproduct stream 148 can supplement or even provide the quantities of hydrogen required by the refining zone 180.

The pyrolysis zone 140 can produce the pyrolysis oil stream 160. Typically, the pyrolysis oil stream 160 includes a mixture of water, organic compounds having lower water solubility, and other oxygenated hydrocarbons having higher water solubility, e.g., aldehydes, ketones, alcohols, and phenolics.

Fast pyrolysis can involve rapid heat transfer to the pretreated feed 120, which can be maintained at a relatively high temperature for a very short time. The temperature of the primary pyrolysis products may then be rapidly reduced before achieving chemical equilibrium. The fast cooling can prevent the valuable reaction intermediates, formed by depolymerization and fragmentation of the biomass building blocks, namely cellulose, hemicellulose, and lignin, from degrading to lesser value final products.

The pyrolysis oil stream 160 can be acidic with a pH of less than about 4.0. Generally, the water molecules are split during pyrolysis and held separately in other compounds within the complex pyrolysis liquid. Thus, the "water" in pyrolysis oil may not separate from the organic fraction of the pyrolysis oil as a phase as in standard petroleum-derived fuels. Generally, the pyrolysis oil stream 160 contains about 30-about 35%, by weight, of oxygen in the form of organic oxygenates such as hydroxyaldehydes, hydroxyketones, sugars, carboxylic acids, and phenolic oligomers as well as dissolved water. For this reason, although a pourable and transportable liquid fuel, usually the pyrolysis oil, has only about 55-about 60% of the energy content of crude oil-based fuel oils. Generally, representative values of the energy content are in the range from about 19.0-about 25.0 MJ/liter.

Properties of a pyrolysis oil can include a heating value of about 15-about 21 MJ/kg, a pour point of about −12-about −33° C., no cloud point observed until about −21° C., a carbon residue of about 17-about 23%, by weight, based on the weight of the pyrolysis oil, and a flash point of about 40-about 100° C. As such, the pyrolysis oil may not auto-ignite in a diesel engine, and the cetane number can be significantly less than ASTM requirements for use in transportation vehicle service, e.g., less than about 25.

While the exact composition of the pyrolysis oil usually depends on the feed 50 and processing conditions, a typical composition is as follows:

TABLE 1

| Component | Amount (%, By Weight) |
| --- | --- |
| Water | about 20-about 28 |
| Suspended solids and pyrolitic lignin | about 22-about 36 |
| Hydroxyacetaldehyde | about 8-about 12 |
| Levoglucosan | about 3-about 8 |
| Acetic acid | about 4-about 8 |
| Acetol | about 3-about 6 |
| Cellubiosan | about 1-about 2 |
| Glyoxal | about 1-about 2 |
| Formaldehyde | about 3-about 4 |
| Formic Acid | about 3-about 6 |

The pyrolysis oil stream 160 can be combined with a portion of a recycle stream 270 as hereinafter described, to form a combined stream 164 to the refining zone 180. Generally, the refining zone 180 hydrogenates and deoxygenates the pyrolysis oil stream 160.

Often, the raw pyrolysis product is corrosive and exhibits chemical instability due to the presence of highly unsaturated compounds such as olefins and alkenylaromatics. Hydroprocessing of this pyrolysis oil stream 160 in the refining zone 180 can reduce its oxygen content and increase its stability, thereby rendering a refined product more suitable for blending in fuels, such as gasoline or diesel. Refining involves contacting the pyrolysis oil with hydrogen and in the presence of a suitable catalyst, generally under conditions sufficient to convert a large proportion of the organic oxygen in the raw pyrolysis oil to carbon monoxide, carbon dioxide, and water that are easily removed.

The catalyst may be present in the form of a fixed bed of particles, including a catalytically active metal disposed on a support, with suitable metals and supports being described below. Otherwise, the catalyst either supported or otherwise unsupported, in the form of fine particles of a compound containing the catalytically active metal, may be used in an ebullated bed or a back-mixed multi-phase bed, such as in the case of a slurry reactor. Homogeneous systems operating with catalysts soluble in the reactants and products may also be used. Catalytic refining conditions can vary depending on the quality of the refined pyrolysis oil desired, with higher severity operations directionally resulting in greater conversion of organic oxygenates and other undesirable compounds, e.g., reactive olefins and diolefins by hydrogenation.

Typically, refining conditions include an average catalyst bed temperature from about 40-about 540° C., preferably about 280-about 430° C., and a hydrogen partial pressure from about 0.7-about 21 MPa or about 2.8-about 21 MPa, preferably about 0.7-about 14 MPa or about 5-about 14 MPa. A typical range of liquid hourly space velocity (herein may be abbreviated "LHSV") for hydroprocessing may be about 0.1-about 10 $hr^{-1}$, preferably about 0.3-about 3 $hr^{-1}$. Generally, a sufficient quantity of hydrogen is provided to convert organic oxygenates to hydrocarbons and water. The refining zone 180 can receive hydrogen from the reforming zone 240 and the another reforming zone 280 via, respectively, the stream 252 and the stream 284.

Suitable refining catalysts include those having at least one Group VIII (IUPAC 8-10) metal, such as iron, cobalt, and nickel and at least one Group VI (IUPAC 6) metal, such as molybdenum and tungsten, on a high surface area support material such as a refractory inorganic oxide, e.g., silica, alumina, titania, and/or zirconia support or a carbon support. Preferably, the catalyst includes at least one of cobalt, molybdenum, nickel, tungsten, platinum, palladium, ruthenium, rhodium, osmium, and iridium.

Typically, the Group VIII metal is present in the catalyst in an amount ranging from about 2-about 20%, by weight, and preferably about 4-about 12%, by weight, based on the volatile-free catalyst weight. Usually, the Group VI metal is present in an amount ranging from about 1-about 25%, by weight, and preferably about 2-about 25%, by weight, also based on the volatile-free catalyst weight. A volatile-free catalyst sample may be obtained by subjecting the catalyst to drying at about 200-about 350° C. under an inert gas purge or vacuum for a period of time, e.g., about 2 hours, to drive water and other volatile components from the catalyst.

Other suitable refining catalysts include zeolitic catalysts, as well as noble metal catalysts where the noble metal is selected from palladium and platinum. More than one type of refining catalyst may be utilized in the same or different reaction vessel. Other suitable refining zones and operating conditions for hydrogenating, hydrotreating, and/or isomerizing are disclosed in, e.g., US 2009/0287029 A1.

After refining, the resulting oil has an oxygen content that is generally reduced from about 90-about 99.9%, relative to the oxygen content of the pyrolysis oil. Typically, the heating value, on a mass basis, of the refined pyrolysis oil is simultaneously increased, usually by a factor of about 1.5-about 3, compared to that of unrefined pyrolysis oil.

The refining zone 180 can provide a refined stream 184 to a separation zone 200. Typically, any separation device can be utilized, such as one or more flash drums. In one exemplary embodiment, a series of high, medium, and optionally low pressure flash drums can be utilized to remove gaseous components that can be combined as a fuel gas stream 210 and a stream 214 including one or more hydrocarbons. Therefore, the fuel gas stream 210 can include one or more of CO, $CO_2$, $CH_4$, $C_2H_6$, $C_3H_8$, $C_4H_{10}$, $H_2$, and $H_2S$. Usually, a high pressure flash drum can operate at about 5-about 21 MPa, a medium pressure flash drum can operate at about 3-about 14 MPa, and a low pressure flash drum can operate at about 1-about 7 MPa.

The fuel gas stream 210 can be provided to a conditioning zone 220. Typically, the conditioning zone 220 can include one or more scrubbers, such as an amine scrubber. The fuel gas stream 210 can include one or more gases, such as one or more C1-C4 hydrocarbons, typically alkanes, carbon monoxide, carbon dioxide, and hydrogen. The conditioning zone can include one or more scrubbers to remove hydrogen sulfide, carbon dioxide, and optionally ammonia. Usually, the conditioning zone 220 can include a water wash column. An exemplary conditioning zone is disclosed in, e.g., US 2009/0287029 A1. After scrubbing, the conditioning zone 220 may optionally also contain one or more vessels for conducting a water shift reaction to convert the carbon monoxide and water to carbon dioxide and hydrogen.

The conditioned stream 230, optionally combined with a make-up fuel gas stream 234, can form a combined stream 238 and be provided to a reforming zone 240. Typically, the reforming zone 240 is a steam reforming zone, as disclosed in, e.g., US 2009/0287029 A1, which may provide hydrogen to the refining zone 180. Usually, a hydrocarbon and steam mixture is catalytically reacted at high temperature to form hydrogen and the carbon oxides, such as carbon monoxide and carbon dioxide. Because the reforming reaction is strongly endothermic, heat is typically supplied by a furnace to the reactant mixture.

One exemplary steam reforming process is autothermal reforming, also called catalytic partial oxidation, which may supply heat by the partial internal combustion of a feed with oxygen or air. Generally, exit temperatures may range from about 500-about 950° C. and pressures may be up to about 6 MPa.

The steam reforming product may be recycled to any of the reaction zones to provide at least hydrogen to the reaction zone. Optionally, the hydrogen may be separated from the carbon oxides generated in the steam reforming reaction, and the separated hydrogen may be recycled to the refining zone 180.

Generally, the reforming zone 240 can not only reform the fuel gas stream to provide components that may optionally be used in fuel, but can also provide power and steam as indicated by the line 248. In addition, a hydrogen stream 252 can be obtained that may optionally pass through a compressor and be provided back to the refining zone 180. Optionally, the hydrogen stream 252 can be purified in a pressure swing absorber prior to being provided to the refining zone 180. As such, the reforming zone 240 can not only provide hydrogen, but also power to the biofuel production facility 10. As such, this recycling of components can minimize the greenhouse gas emissions of any subsequent renewable hydrocarbon fuel produced.

The one or more hydrocarbons in the stream 214 from the separation zone 200 can be provided to a fractionation zone 260. The fractionation zone 260 can produce a fuel gas stream 262; a first renewable hydrocarbon fuel stream 264, typically a renewable naphtha or gasoline; a second renewable hydrocarbon fuel stream 266, typically a renewable diesel; and a bottom stream 268. Typically, the naphtha or gasoline has an initial boiling point temperature characteristic of C5 hydrocarbons, for example from about 30-about 40° C. and a distillation end point temperature generally of about 130-about 220° C., and typically about 130-about 160° C. The boiling point range of naphtha or gasoline may be about 20-about 180° C., preferably about 50-about 150° C. The renewable diesel can have boiling point characteristics similar to petroleum fuel and may have a range of about 120-about 380° C., preferably about 150-about 350° C. These boiling point temperatures, which are also characteristic of petroleum derived gasoline and diesel, may be measured according to ASTM D86. In one exemplary embodiment, the fuel gas stream 262 can include one or more C4$^-$ hydrocarbons. Optionally, at least a portion of these biomass-derived C4$^-$ hydrocarbons can be provided to the reforming zone 240 to generate at least a portion of the hydrogen for the refining zone 180.

The bottom stream 268 can include one or more heavier hydrocarbons, such as one or more C9$^+$ hydrocarbons, which can be recycled to at least one of the refining zone 180 as a portion 270 or to the pyrolysis zone 140 as another portion 274. The recycle to the pyrolysis zone 140 can be provided to the reactor outlet as a more thermally stable quench oil for cooling the hot pyrolysis vapor leaving the pyrolysis reactor. Quenching the hot vapor can quickly stop the thermal reactions and prevent polymerization and the associated formation of high molecular weight oxygenated hydrocarbons. When the bottom stream 268 is recycled to the refining zone 180, the temperature rise can be favorably buffered. In addition, the concentration of reactive species entering the refining zone 180 is diluted with a more thermally stable and hydrogen rich bottom stream 268 so as to minimize undesirable side reactions that can lead to high coke formations. In addition, removing the bottom stream 268 from the fractionation zone 260 can not only provide the recycle streams 270 and 274, but a portion of this heavier hydrocarbon can be taken as a product stream 278.

The embodiments disclosed herein can provide a process utilizing a renewable hydrogen stream to reduce carbon emissions. In one estimate, utilizing such a renewable feed in a pyrolysis process can reduce lifecycle greenhouse gas emissions of about 80% or more for producing a renewable hydrocarbon or transportation fuel, usually renewable gasoline, as compared to a petroleum derived transportation fuel.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing, all temperatures are set forth in degrees Celsius and, all parts and percentages are by weight, unless otherwise indicated.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for producing a renewable hydrocarbon fuel, comprising:
   providing a feed comprising a lignocellulosic material to a pyrolysis zone to produce a stream comprising a liquid pyrolysis oil;
   passing the liquid pyrolysis oil stream to a refining zone to produce a refined stream;
   passing at least a portion of the refined stream to a reforming zone to producing a stream comprising hydrogen;
   passing at least a portion of the hydrogen stream to the refining zone; and
   recovering a renewable hydrocarbon fuel from the reforming zone.

2. The process according to claim 1, wherein the lignocellulosic material comprises at least one of cellulose, hemicellulose, and lignin.

3. The process according to claim 1, wherein the renewable hydrocarbon fuel has lifecycle greenhouse gas emissions of no more than about 40 g $CO_2$ equivalent/MJ.

4. The process according to claim 1, wherein the reforming zone comprises a steam reforming zone.

5. The process according to claim 1, further comprising providing the refined stream to a separation zone to obtain the renewable hydrocarbon fuel and a fuel gas stream comprising one or more of CO, $CO_2$, $CH_4$, $C_2H_6$, $C_3H_8$, $C_4H_{10}$, $H_2$, and $H_2S$.

6. The process according to claim 5, wherein the separation zone comprises one or more flash drums.

7. The process according to claim 5, further comprising passing the fuel gas stream to a conditioning zone.

8. The process according to claim 7, wherein the conditioning zone comprises a scrubber.

9. The process according to claim 8, further comprising passing the scrubbed fuel gas stream to the steam reforming zone.

10. The process according to claim 1, further comprising pretreating the renewable feed prior to entering the pyrolysis zone.

11. The process according to claim 10, wherein the pretreating comprises at least one of sizing, magnetic separation, drying, and grinding.

12. The process according to claim 1, wherein the pyrolysis zone is at a temperature of about 300-about 600° C.

13. The process according to claim 1, wherein the refining zone comprises a reactor containing a catalyst comprising at least one of cobalt, molybdenum, nickel, tungsten, platinum, palladium, ruthenium, rhodium, osmium, and iridium.

14. The process according to claim 1, wherein the refining zone is at a temperature of about 280-about 430° C. and a hydrogen partial pressure of about 0.7-about 14 MPa.

15. A process for producing a renewable hydrocarbon fuel while minimizing fossil fuel derived carbon dioxide emissions, comprising:
   providing a lignocellulosic material to a pretreating zone to obtain a pretreated feed;
   providing the pretreated feed to a pyrolysis zone to produce a liquid stream comprising a pyrolysis oil;
   providing the liquid pyrolysis oil stream to a refining zone to produce a refined stream;
   providing the refined stream to a separation zone to obtain a stream comprising a fuel gas and a stream comprising one or more hydrocarbons;
   providing the fuel gas stream to a conditioning zone to obtain a conditioned stream;
   providing the conditioned stream to a reforming zone to obtain a stream comprising hydrogen; and
   providing the hydrogen stream to the refining zone.

16. The process according to claim 15, wherein the reforming zone comprises an aqueous phase reforming zone.

17. The process according to claim 15, wherein the reforming zone comprises a steam reforming zone.

18. The process according to claim 15, wherein the separation zone comprises one or more flash drums.

19. The process according to claim 15, wherein the conditioning zone comprises a scrubber.

20. A process for producing a renewable hydrocarbon fuel while minimizing fossil-derived carbon dioxide emissions, comprising:
   grinding a lignocellulosic material in a pretreating zone to obtain a pretreated feed;
   heating the pretreated feed in a pyrolysis zone to produce a liquid stream comprising a pyrolysis oil;
   hydrotreating the liquid pyrolysis oil in a refining zone to produce a refined stream;
   separating the refined stream to obtain a stream comprising a fuel gas and a stream comprising one or more hydrocarbons;
   scrubbing the fuel gas stream;
   reforming the fuel gas stream to obtain a stream comprising hydrogen; and,
   providing the hydrogen stream to the refining zone.

* * * * *